United States Patent
Tang et al.

(10) Patent No.: US 7,970,804 B2
(45) Date of Patent: Jun. 28, 2011

(54) JOURNALING FAT FILE SYSTEM AND ACCESSING METHOD THEREOF

(75) Inventors: Chih-Chuan Tang, Pingtung (TW); Hung-Lin Chou, Jhonghe (TW)

(73) Assignee: Sunplus MMobile Inc., Hsinchu (TW)

( * ) Notice: Subject to any disclaimer, the term of this patent is extended or adjusted under 35 U.S.C. 154(b) by 433 days.

(21) Appl. No.: 12/222,979

(22) Filed: Aug. 21, 2008

(65) Prior Publication Data

US 2009/0055452 A1    Feb. 26, 2009

(30) Foreign Application Priority Data

Aug. 21, 2007  (TW) .............................. 96130867 A

(51) Int. Cl.
*G06F 12/00* (2006.01)
*G06F 17/30* (2006.01)

(52) U.S. Cl. ........ 707/822; 707/823; 707/824; 707/827; 711/133; 711/166; 380/44

(58) Field of Classification Search ................. 707/822, 707/823, 824, 827; 711/133, 166; 380/44
See application file for complete search history.

(56) References Cited

U.S. PATENT DOCUMENTS

| | | | | |
|---|---|---|---|---|
| 6,377,958 B1 * | 4/2002 | Orcutt | ........................... | 707/690 |
| 7,155,448 B2 * | 12/2006 | Winter | ........................... | 707/824 |
| 7,861,311 B2 * | 12/2010 | Seo et al. | ....................... | 707/828 |
| 2004/0157638 A1 * | 8/2004 | Moran et al. | ................ | 455/550.1 |
| 2004/0193564 A1 * | 9/2004 | Ban et al. | ........................... | 707/1 |
| 2006/0282484 A1 * | 12/2006 | Stakutis et al. | ................ | 707/204 |
| 2008/0165917 A1 * | 7/2008 | Xu et al. | ........................ | 382/131 |
| 2008/0165957 A1 * | 7/2008 | Kandasamy et al. | ........... | 380/44 |
| 2009/0055452 A1 * | 2/2009 | Tang et al. | ..................... | 707/205 |
| 2010/0138619 A1 * | 6/2010 | Benavides | ..................... | 707/822 |

OTHER PUBLICATIONS

David Woodhouse—"JFFS2: The Journalling Flash File System, Version 2"—2003 p. 1. http://sourceware.org/jffs2/).*
Kaashoek et al. "The Logical Disk: A New Approach to Improving File System"—SOSP'93 Proceedings of the fourteenth ACM Symposium on Operating Systems Principles—vol. 27, Issue 5, Dec. 1993 (pp. 15-28:1-14).*
Ashley Morgan Anderson—"A Steganographic File System for the Linux Kernel"—The University of Exeter 11$^{th}$, Aug. 2007 (pp. 1-35).*

* cited by examiner

*Primary Examiner* — John E Breene
*Assistant Examiner* — Anh Ly
(74) *Attorney, Agent, or Firm* — Bacon & Thomas, PLLC

(57) ABSTRACT

A journaling file allocation table (FAT) file system includes an FAT file system module, a storage device and a driver. The FAT file system module includes a journaling module and receives a file operation instruction sent by an operating system. The storage device has an FAT file system and an FAT journaling cache. The driver is coupled to the FAT file system module, the journaling module and the storage device in order to access the storage device. When the FAT file system stored in the storage device is a journaling FAT file system, the FAT file system module enables the journaling module to receive and execute the file operation instruction sent by the operating system and to accordingly produce a corresponding file operation instruction to the driver for performing a journaling file operation on the storage device.

13 Claims, 7 Drawing Sheets

| | Field name | Shift (Bytes) | Shift (Bytes) | Description |
|---|---|---|---|---|
| 201 | Directory name field | 0 | 11 | Record the filename of a file |
| 203 | Directory attribute field | 11 | 1 | Record an attribute of the file |
| 205 | Reserved field | 12 | 1 | Record one byte for identification |
| 207 | File generation time subfield | 13 | 1 | Record the generation millisecond time of the file |
| 209 | File generation time field | 14 | 2 | Record the generation time of the file |
| 211 | File generation date field | 16 | 2 | Record the generation date of the file |
| 213 | Last access date field | 18 | 2 | Record the last access date of the file |
| 215 | File cluster field 1 | 20 | 2 | Record the number of first clusters of the directory entry |
| 217 | File Write time field | 22 | 2 | Record the write time of the file |
| 219 | File Write data field | 24 | 2 | Record the write date of the file |
| 221 | File cluster field 2 | 26 | 2 | Record the number of second clusters of the directory entry |
| 223 | File size field | 28 | 4 | Record the size of the file |

FIG. 2

```
Typedef struct tJournalRegionInfoTag
{
  UINT32    NonVolatileMagicCodeFirst;
  UINT32    NonVolatileMagicCodeSecond;
  UINT32    NonVolatileMagicCodeThird;
  UINT32    NonVolatileMagicCodeFourth;
  UINT32    JournalStartSector;
  UINT32    JournalRegionIsDirty;
  UINT32    JournalMode;
  UINT32    DirRegionStartSector;
  UINT32    DataRegionStartSector;

UINT32    FatRegionDirty;
  UINT16    FatSectorNo[UFAT_JOURNAL_DUMMY >> 1];

UINT32    DirRegionDirty;
  UINT32    DirSectorNo[UFAT_JOURNAL_DIR_SECTOR_COUNT];

UINT32    DataRegionDirty;
  UINT32    DataFirstSectorInCluster;
  UINT32    DataSectorInFirstCluster;
  UINT32    DataInconsectiveSectorCluster;

UINT32    UfatSignature;
}tJournalRegionInfo
```

FIG. 3

JOURNALING FAT FILE SYSTEM AND ACCESSING METHOD THEREOF

BACKGROUND OF THE INVENTION

1. Field of the Invention

The present invention relates to the technical field of file system and, more particularly, to a journaling file allocation table (FAT) system and the accessing method thereof.

2. Description of Related Art

With the rapid advance of electronic technologies, the developed electronics can provide various applications. An electronic device typically uses a NAND or NOR flash memory as a storage device and stores an operating system in the storage device. The operating system typically supports an FAT file system for the electronic device to connect with a PC. However, a typical FAT file system cannot provide an error correction to avoid a data write failure. Accordingly, when a consumer electronic product with the FAT file system has a power failure or other hardware errors during a write operation, the written data is possibly damaged and cannot be read again.

The FAT32 system is widely used in the current PCs. On the design, the FAT file system is an essential operation platform for a PC-based environment. For a PC, such a data damage can be restored by a software kit such as Scandisk. Thus, the file incompleteness caused by the data write failure is not considered on the system configuration. However, the consumer electronic products are stressed on easy-to-use, so a user has to learn how to use such a software kit like Scandisk in re-implementation of the operating system, which is unreasonable and unacceptable to the most users.

To overcome this, the prior art arranges two same flash memories in mirroring to avoid the write data damage. However, such a way requires more memory space and relatively increases the hardware cost for the consumer electronic products with limited resources.

To overcome the aforementioned problem, the prior art uses a journaling file system. The data management mechanism of the journaling file system can write the data to a prearranged block before a corresponding position in the journaling file system, and the data successfully written to the block is written substantially to the corresponding position at the appropriately selected time.

A storage device of a typical handheld device generally is a flash memory which has a requirement of erasing the old data before a write operation. If the power failure occurs in the handheld device at the moment that the old data is erased while the new one is not written in the corresponding position of the flash memory, the old data is lost and cannot be restored. However, the journaling file system can avoid such a problem, i.e., it ensures to prevent the problem of non-integral data storage caused by an incomplete data update.

In general, a handheld device is implemented with an FAT file system for the communication with a PC and a journaling file system for the data security. Both the FAT file system, such as FAT32, and the journaling file system, such as JFFS, are concurrently implemented in such consumer electronic products, so that the problem of the hardware cost increased in the prior mirroring manner is overcome. However, for a system design, two different file systems are necessarily maintained, and the complexity on the system design is relatively increased.

Therefore, it is desirable to provide an improved file system for a handheld device to mitigate and/or obviate the aforementioned problems.

SUMMARY OF THE INVENTION

The object of the present invention is to provide a journaling FAT file system and the accessing method thereof, which can provide a preferred data protection.

According to a feature of the invention, an accessing method for a journaling file allocation table (FAT) file system is provided. The journaling FAT file system includes an FAT file system module, a storage device and a driver. The FAT file system module includes a journaling module. The storage device has an FAT file system and an FAT journaling cache. The FAT file system has multiple files. The accessing method includes the steps of: (A) the FAT file system module using the driver to read the FAT file system of the storage device; (B) the FAT file system module enabling the journaling module when the FAT file system is a journaling FAT file system, wherein the journaling module enabled produces a corresponding file operation instruction to the driver when an operating system accesses the storage device, and the driver performs a journaling file operation on the storage device according to the corresponding file operation instruction sent by the journaling module; and (C) performing a typical FAT file operation when the FAT file system is not the journaling FAT file system.

According to another feature of the invention, a journaling file allocation table (FAT) file system is provided. The journaling FAT file system includes an FAT file system module, a storage device and a driver. The FAT file system module includes a journaling module and is coupled to an operating system in order to receive a file operation instruction sent by the operating system. The storage device has an FAT file system and an FAT journaling cache. The driver is coupled to the FAT file system module, the journaling module and the storage device in order to access the storage. When the FAT file system stored in the storage device is a journaling FAT file system, the FAT file system module enables the journaling module to receive and execute the file operation instruction sent by the operating system and to accordingly produce a corresponding file operation instruction to the driver. The driver performs a file operation on the storage device based on the corresponding file operation instruction sent by the journaling module.

Other objects, advantages, and novel features of the invention will become more apparent from the following detailed description when taken in conjunction with the accompanying drawings.

BRIEF DESCRIPTION OF THE DRAWINGS

FIG. 2 is a schematic diagram of a data structure of a file allocation table (FAT) according to the invention;

FIG. 3 is a schematic diagram of a data structure named 'tJournalRegionInfor' which is a global variable according to an embodiment of the invention;

DETAILED DESCRIPTION OF THE PREFERRED EMBODIMENT

Figure 1:
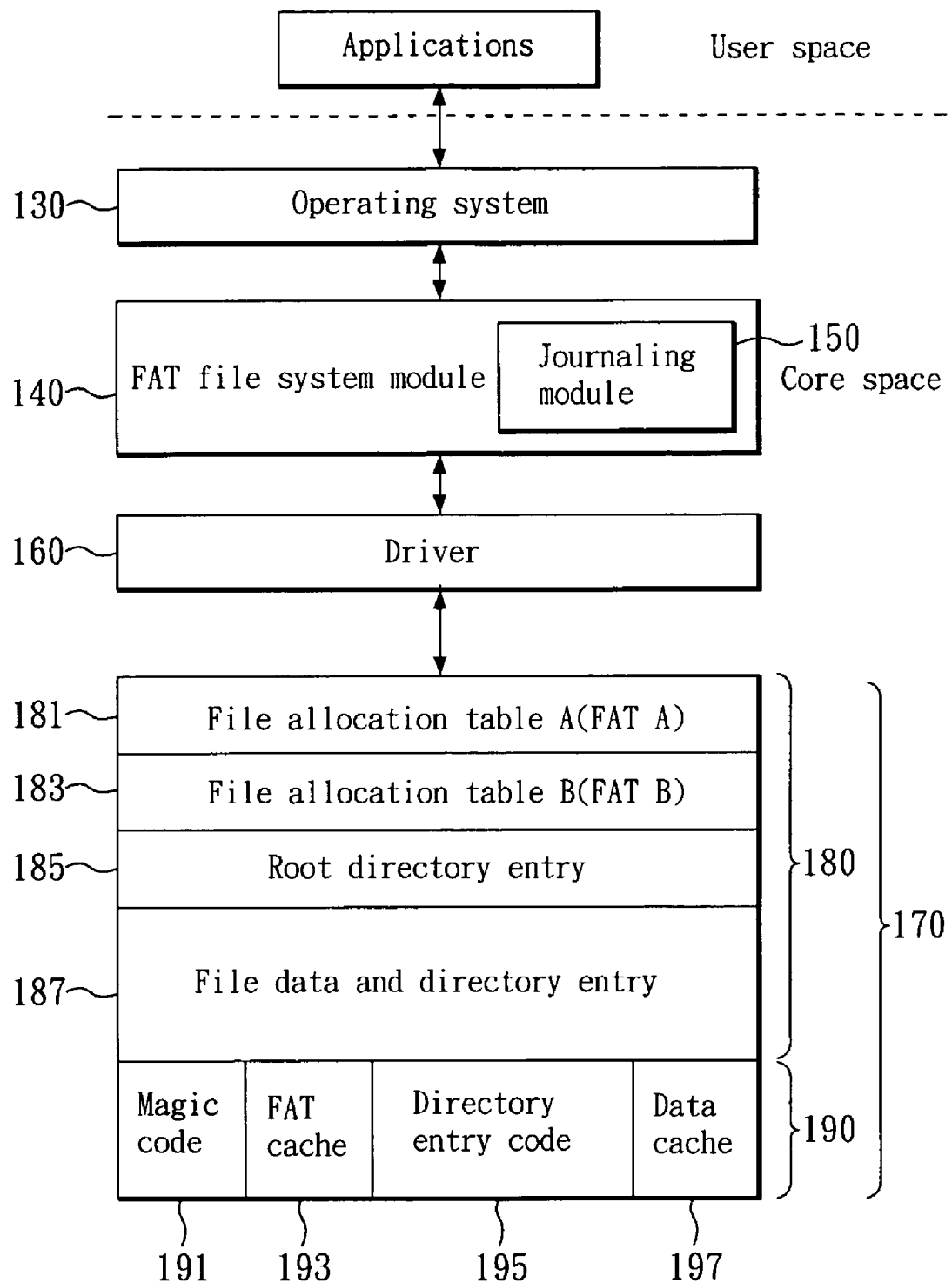
FIG. 1 is a schematic diagram of a journaling FAT file system according to the invention.

FIG. 1 is a schematic diagram of a journaling FAT file system according to the invention, which includes an FAT file system module 140, a driver 160 and a storage device 170.

The FAT file system module 140 is coupled to an operating system 130 in order to receive a file operation instruction sent by the operating system 130. The FAT file system module 140 includes a journaling module 150.

The operating system 130 is a core software layer for processing system calls associated with the file systems. The operating system 130 essentially provides a general-purpose interface to different file systems.

The driver 160 is coupled to the FAT file system module 140, the journaling module 150 and the storage device 170 in order to access the storage 170. The driver 160 is a block device driver.

The storage device 170 has an FAT file system 180 and an FAT journaling cache 190. The storage device 170 is a NAND or NOR flash memory storage device, or a disk drive.

The FAT file system 180 of the storage device 170 is an FAT12, FAT16 or FAT32 file system. The FAT file system 180 includes the parts of a file allocation table A (FAT A) 181, a file allocation table B (FAT B) 183, a root directory entry 185 and a file data and directory entry 187.

The FAT A181 stores a file's filename, position and size of the storage device 170, and the FAT file system 180 can refer to the FAT A181 for a file access to the storage device 170.

FIG. 2 is a schematic diagram of a data structure of the file allocation table (FAT) A181 according to the invention. The data structure of the FAT A181 has a directory name field 201, a directory attribute field 203, a reserved field 205, a file generation time subfield 207, a file generation time field 209, a file generation date field 211, a last access date field 213, a file write time field 217, a file write date field 219, two file cluster fields 215, 221, and a file size field 223.

The directory name field 201 has a length of 11 bytes to record the filename of a corresponding file, with the content '0x00' of the first byte to indicate that a corresponding directory entry can be used freely and is not followed by any directory entry, and with the content '0xE5' to indicate that the corresponding directory entry can be used freely and is followed by a directory entry, i.e., the file corresponding to the directory entry is deleted.

The directory attribute field 203 has a length of one byte to record the attribute of the corresponding file, with the content '0x01' to indicate recording file's attribute of 'read-only', '0x02' to indicate recording file's attribute of 'hidden', '0x04' to indicate recording file's attribute of 'system', '0x08' to indicate recording file's attribute of 'volume_id', '0x10' to indicate recording file's attribute of 'directory', and '0x20' to indicate recording file's attribute of 'archive'.

The reserved field 205 has a length of one byte. The file generation date field 211 has a length of two bytes to record the generation date of the file. The file generation time field 209 has a length of two bytes to record the generation time of the file. The file generation time subfield 207 has a length of one byte to record the generation millisecond time of the file.

The last access date field 213 has a length of two bytes to record the last access date of the file. The file write date field 219 has a length of two bytes to record the write date of the file. The file write time field 217 has a length of two bytes to record the write time of the file.

The two file cluster fields 215, 221 has a total length of four bytes to record the number of first clusters of the directory entry. The file size field 223 has a length of four bytes to record the size of the file in a unit of byte.

The FAT file system 180 has another FAT B183 to prevent a loss of data.

The root directory entry 185 necessarily presents in the FAT file system 180 for an entry of the FAT file system 180. The file data and directory entry 187 stores the files and directories.

The FAT journaling cache 190 of the storage device 170 includes a magic code 191, an FAT cache 193, a directory entry cache 195 and a data cache 197 to thereby allow the FAT journaling cache 190 to execute a one-file-operation journaling.

When the FAT file system 180 of the storage device 170 is a journaling FAT file system, the FAT file system module 140 enables the journaling module 150. The journaling module 150 receives and executes the file operation instruction sent by the operating system 130 and to accordingly produce a corresponding file operation instruction to the driver 160 for performing a journaling file operation on the storage device 170.

For the FAT file system 180, only the areas of FAT, directory entry and physical write data are to be changed. Accordingly, the journaling FAT file system of the invention essentially protects the above three areas. The FAT journaling cache 190 contains an FAT cache 193, a directory entry cache 195 and a data cache 197 corresponding to the above three areas, respectively, for providing a file write/change protection. Namely, the journaling module 150 backups the FAT, directory entry and physical data to be changed to the FAT cache 193, directory entry cache 195 and data cache 197 of the FAT journaling cache 190 at each write operation. After the file-related data is read out of the FAT journaling cache 190 and written to the FAT file system 180, the journaling module 150 removes the backup data from the FAT journaling cache 190.

The journaling FAT file system operates with a global variable 'tJournalRegionInfo' and records the states of the FAT journaling cache 190. FIG. 3 is a schematic diagram of the data structure of global variable 'tJournalRegionInfor' according to an embodiment of the invention. The content of 'tJournalRegionInfo' is stored in the first sector of the FAT journaling cache 190, i.e., the magic code 191.

When the storage device 170 is mounted to the file system, the FAT file system module 140 finds the position where 'tJournalRegionInfo' is stored, and accordingly reads the content of 'tJournalRegionInfo'. The FAT file system module 140 determines whether the value of the variable 'UfatSignature' included in 'tJournalRegionInfo' is equal to a predetermined value. It is determined that the storage device 170 can support the journaling FAT file system when the two values are equal. Thus, the FAT file system module 140 enables the journaling module 150.

For each write operation, the journaling module 150 clears the variable 'NonVolatileMagicCode' to a predetermined value such as '0x00000000000000000000000000000000' or '0xFFFFFFFFFFFFFFFFFFFFFFFFFFFFFFFF'. After backuping the FAT, directory entry and physical data to the FAT cache 193, directory entry cache 195 and data cache 197 respectively, the journaling module 150 sets 'NonVolatileMagicCode' to another predetermined value such as '0x98646723372932948735652481324672' to accordingly determine whether the backup operation is successful.

Figure 4:
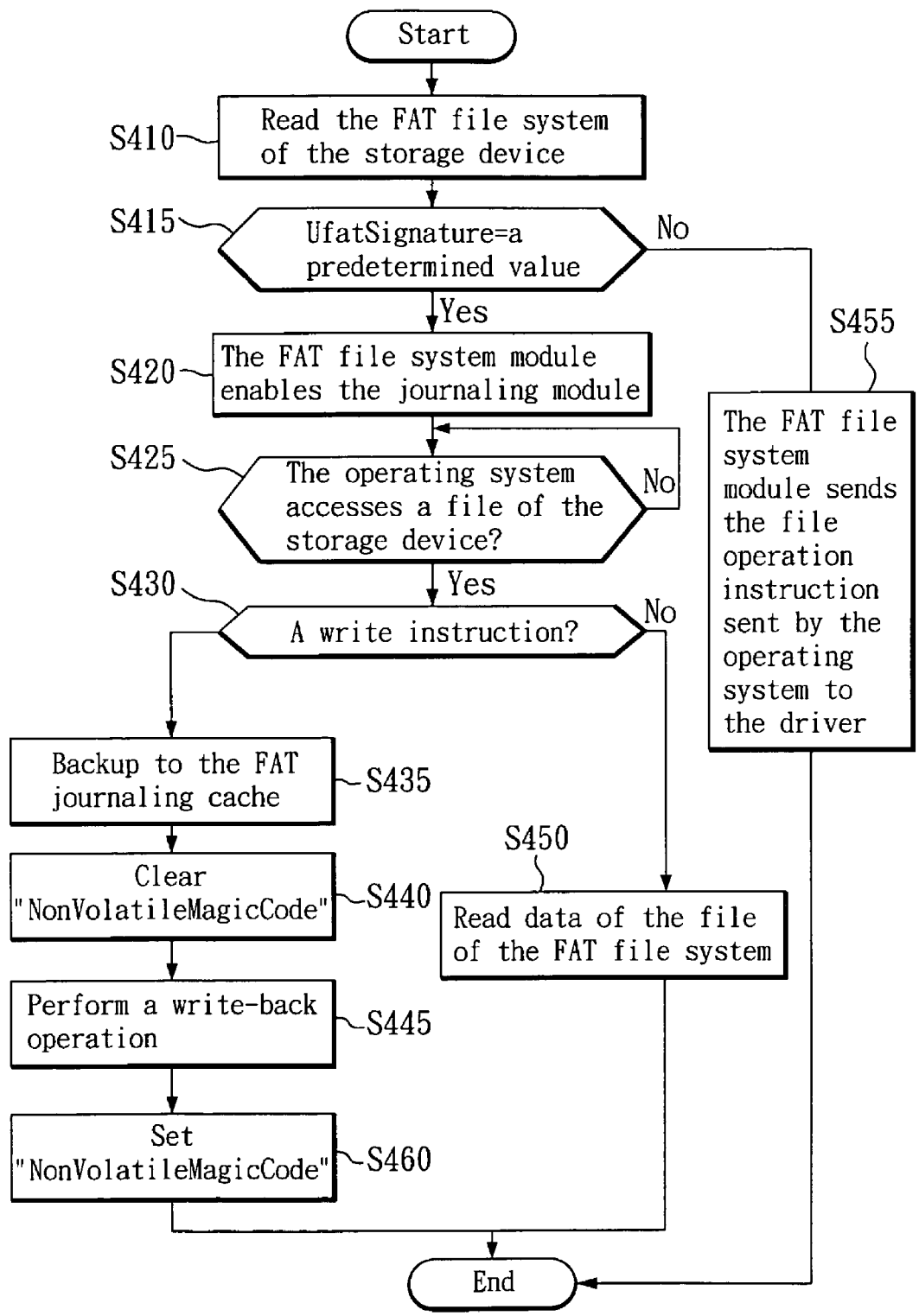
FIG. 4 is a flowchart of an accessing method for a journaling FAT file system according to the invention.

FIG. 4 is a flowchart of an accessing method for a journaling FAT file system according to the invention. The journaling FAT file system includes an FAT file system module 140, a storage device 170 and a driver 160. The FAT file system module 140 includes a journaling module 150. The storage device 170 has an FAT file system 180 and an FAT journaling cache 190. The FAT file system 180 has a plurality of files.

In step S410, the FAT file system module 140 uses the driver 160 to read the FAT file system 180 of the storage device 170. The FAT file system module 140 finds the position where 'tJournalRegionInfo' is stored, and accordingly reads the content of 'tJournalRegionInfo'.

In step S415, the FAT file system module 140 determines whether the value of the variable 'UfatSignature' included in 'tJournalRegionInfo' is equal to a predetermined value. It is determined that the storage device 170 can support the journaling FAT file system when the two values are equal. Thus, the FAT file system module 140 enables the journaling module 150 (step S420).

In step S425, the FAT file system module 140 determines whether the operating system 130 accesses a file of the storage device 170. The journaling module 150 receives and executes the file operation instruction sent by the operating system 130 when it is determined that the operating system 130 accesses the file of the storage device 170, and accordingly produces a corresponding file operation instruction to the driver 160. The driver 160 performs a file operation on the storage device 170 based on the corresponding file operation instruction sent by the journaling module.

In step S430, the journaling module 150 determines whether the file operation instruction is a write instruction. The journaling module 150 backups the FAT, directory entry and physical data to be changed by this write instruction to the FAT cache 193, directory entry cache 195 and data cache 197 of the FAT journaling cache 190 (step S435). Before this file operation instruction is complete, the journaling module 150 performs a write-back operation. Next, step S440 clears 'NonVolatileMagicCode' to a predetermined value (such as '0x00000000000000000000000000000000' or '0xFFFFFFFFFFFFFFFFFFFFFFFFFFFFFFFF'). Next, in step S445, the content of the FAT cache 193, directory entry cache 195 and data cache 197 of the FAT journaling cache 190 is written back to corresponding positions of the FAT file system 180. In step S460, when the write-back operation is successful, the journaling module 150 sets 'NonVolatileMagicCode' to another predetermined value (such as '0x98646723372932948735652481324672'), and accordingly determines whether the journaling module 150 successfully writes the desired content of the FAT journaling cache 190 back to the FAT file system 180.

In step S430, the journaling module 150 determines that the file operation instruction is not a write instruction, and accordingly reads the file data of the FAT file system 180 of the storage device 170 directly (S445).

In step S415, the FAT file system module 140 determines that the value of 'UfatSignature' of 'tJouran1RegionInfo' is not equal to the predetermined value, the FAT file system module 140 disables the journaling module 150. In this case, the file operation is operated in a conventional manner. Namely, the FAT file system module 140 sends the file operation instruction sent by the operating system 130 to the driver 160 for a file operation.

Figure 5:
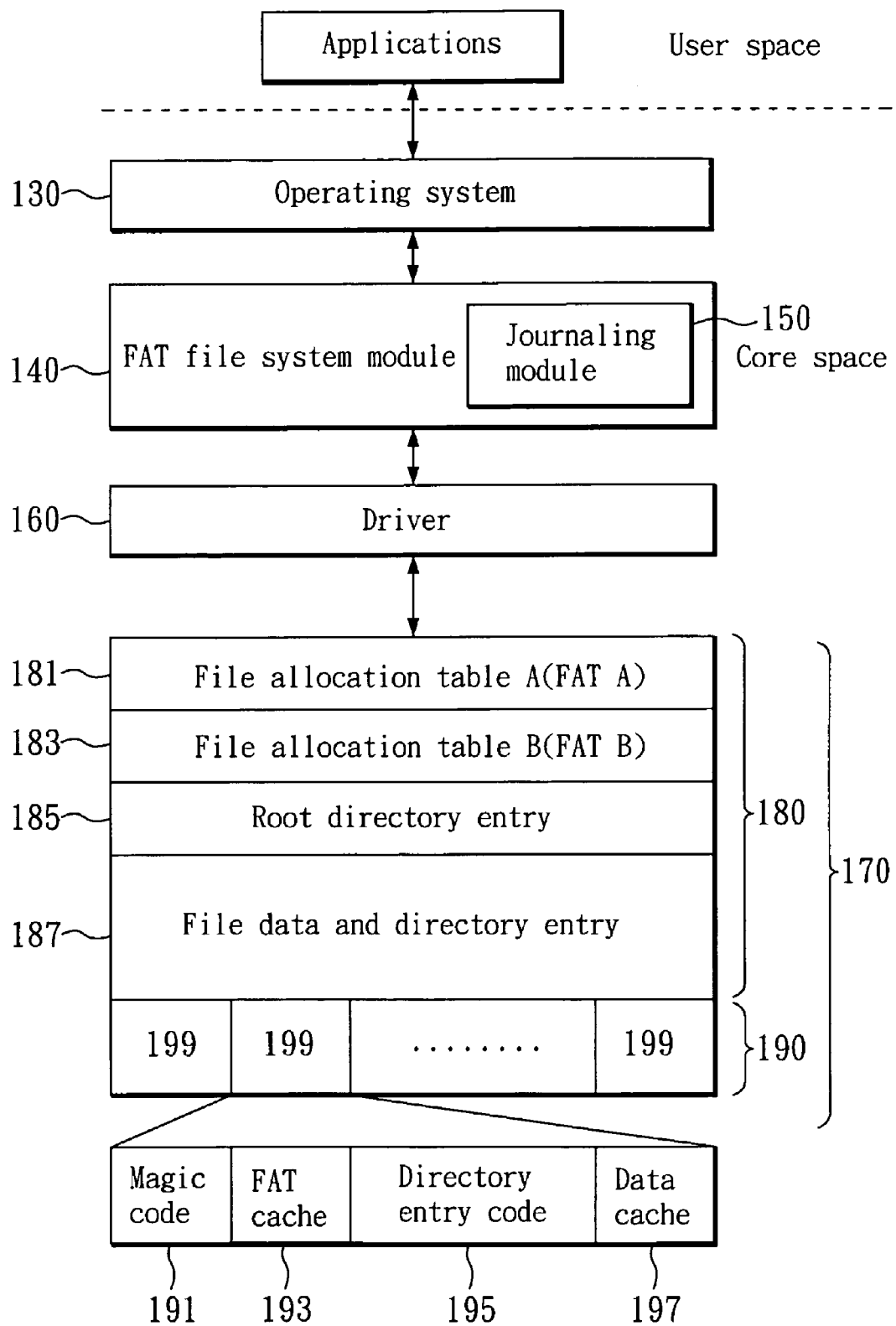
FIG. 5 is a schematic diagram of another embodiment of a journaling FAT file system according to the invention.

FIG. 5 is a schematic diagram of another embodiment of a journaling FAT file system according to the invention. In this embodiment, the difference is in that the FAT journaling cache 190 includes a plurality of cache blocks 199, as compared to FIG. 1. Each cache block 199 contains a magic code 191, an FAT cache 193, a direction entry cache 195 and a data cache 197 to thereby allow the FAT journaling cache 199 to execute multiple-file-operation journaling.

In this embodiment, the mechanism for multiple file writes/changes is provided. The journaling module 150 backups the FAT, directory entry and physical data to be changed to corresponding cache blocks 199 each time, and writes multiple changed files to the FAT file system 180 at one time when the corresponding cache blocks 199 are full or the accumulated time is reached to a predetermined value.

Figure 6:
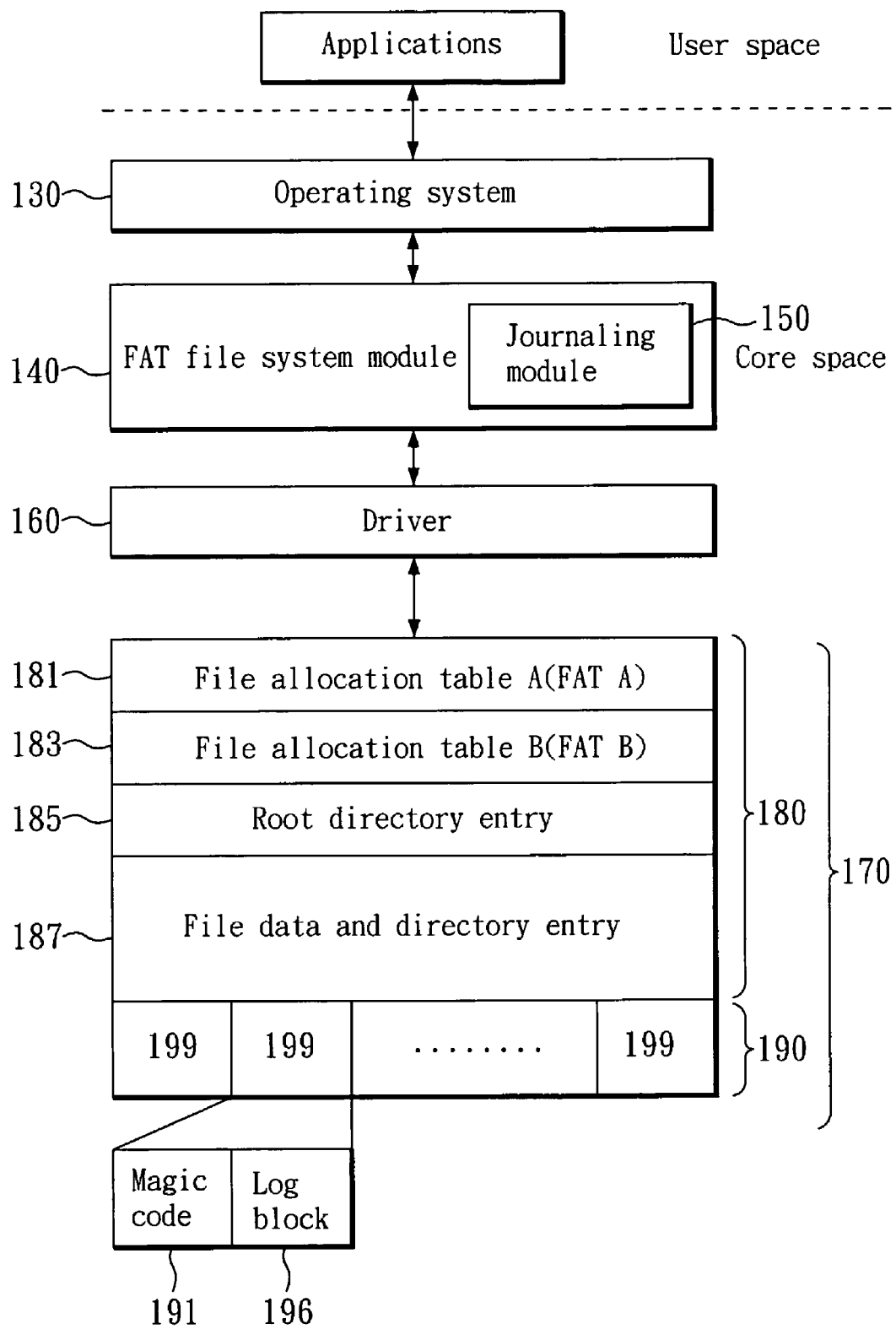
FIG. 6 is a schematic diagram of a further embodiment of a journaling FAT file system according to the invention.

FIG. 6 is a schematic diagram of a further embodiment of a journaling FAT file system according to the invention. In this embodiment, the difference is in that the FAT journaling cache 190 includes a plurality of log caches 198, as compared to FIG. 1. Each log cache 198 contains a magic code 191 and a log block 196.

Figure 7:
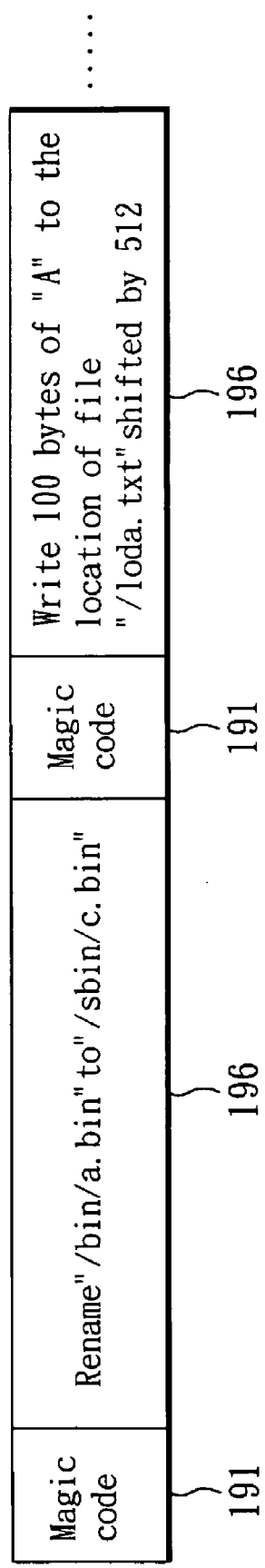
FIG. 7 is a schematic diagram of log caches according to the invention.

FIG. 7 is a schematic diagram of the log caches 198 according to the invention. Each log cache 198 contains a magic code 191 and a log block 196. The journaling module 150 defines or describes a representation for each log block 196 according to the different write operations. As shown in FIG. 7, the log block 196 records "move the file '/bin/a.bin' to the directory '/etc'", "rename '/bin/a.bin' to '/sbin/c.bin'", "write 100 bytes of 'A' to the location of file '/loda.txt' shifted by 512", or "shift 1024 bytes and start to write a 512-byte binary data to the file '/etc/back.bin'"

The log blocks 196 operates a journaling by recording a descriptive mechanism. Such a manner can change the complexity of a file according to each need. For example, when a large amount of data is written, it can be done in a simple description as a lot of data to be written is with a same value (such as '0') and has no need to copy a full record of data.

The complexity of the descriptive mechanism depends on the processor used in a consumer electronic product. If the computation of the processor is strong, the descriptive language can provide a more detail description, such as "totally 512 bytes written, the first 256 bytes to 'B', the following 128 bytes to 'X', the last 128 bytes are non-standard buffer data". If the computation of the processor is poor, the descriptive mechanism is relatively simple, such as "totally 512 bytes written, as following 512-byte buffer data". In this case, the time of processing the descriptive mechanism by the processor is shifted to the storage space.

The FAT journaling cache 190 essentially uses a journaling mechanism to protect the FAT cache 193, directory entry cache 195 and data cache 197. Namely, the FAT file system 180 only changes the content of the directory entry for a file movement, as shown in the typical FAT file system. For example, to move a file A from a path B to a path C, the FAT file system 180 only requires moving the content of the directory entry stored in the path B for the file A to the storage location of the directory entry of the path C.

For a delete operation, such as to delete the file A at the path B, the path B is firstly found, then the directory entry stored in the path B for the file A is found, next the FAT locations occupied by the file A are released one-by-one according to the FAT described in the directory entry for the file A, and finally the directory entry for the file A is released.

For a write operation, such as to write a data to the file A at the path B, the path B is firstly found, then the directory entry stored in the path B for the file A is found, and finally the data is overwritten to corresponding storage locations described in the FAT, which is described in the directory entry for the file A. If the size of the data to be written is over the corresponding storage locations, a more storage space of the FAT is requested for the write operation. After the write operation is complete, the associated attributes (such as the file size and the updated date) of the directory entry for the file A are updated.

For a read operation, such as to read a data of the file A at the path B, the path B is firstly found, then the directory entry stored in the path B for the file A is found, and finally the storage locations corresponding to the data to be read is found and read according to the FAT described in the directory entry for the file A.

In view of the foregoing, it is known that the invention is different from the prior art in that: (1) the FAT file system can have a journaling support capability without changing the current configuration and affecting other operating systems which cannot support a journaling function, for example, the capability of reading a same block of data by the Microsoft Windows on a PC; (2) the FAT file system newly adds the FAT journaling cache 190 to be a data temporary location for supporting the journaling function; and (3) a single-file-system driver configuration can support a typical data write and a journaling data write/change protection concurrently. Accordingly, the invention can provide a better data protection than the prior art.

Although the present invention has been explained in relation to its preferred embodiment, it is to be understood that many other possible modifications and variations can be made without departing from the spirit and scope of the invention as hereinafter claimed.

What is claimed is:

1. An accessing method for a journaling file allocation table (FAT) file system, the journaling FAT file system including an FAT file system module, a storage device and a driver, the FAT file system module having a journaling module, the storage device having an FAT file system and an FAT journaling cache, the FAT file system having multiple files, the method comprising the steps of:
   (A) the FAT file system module using the driver to read the FAT file system of the storage device;
   (B) the FAT file system module enabling the journaling module when the FAT file system is a journaling FAT file system, wherein the journaling module enabled produces a corresponding file operation instruction to the driver when an operating system accesses the storage device, and the driver performs a journaling file operation on the storage device according to the corresponding file operation instruction sent by the journaling module; the journaling module writing a data to the FAT journaling cache of the storage device and writing the data to the FAT file system of the storage device when the operating system performs a write operation on the storage device;
   (C) performing a typical FAT file operation when the FAT file system is not the journaling FAT file system; and
   wherein step (B) further comprises:
   (B-1) the journaling module synchronizing the data of the FAT journaling cache to the FAT file system and reading the FAT file system when the operating system performs a read operation on the storage device.

2. The method as claimed in claim 1, wherein step (B) further comprises:
   (B-2) the FAT file system module performing a file operation on the driver according to the operating system when the journaling module is not enabled.

3. The method as claimed in claim 1, wherein the storage device is an NAND, NOR flash memory storage device, or a disk drive.

4. The method as claimed in claim 1, wherein the FAT file system of the storage device is an FAT12, FAT16 or FAT32 file system.

5. The method as claimed in claim 1, wherein the FAT journaling cache of the storage device comprises an FAT cache, a directory entry cache and a data cache to thereby allow the FAT journaling cache to execute an one-file-operation journaling.

6. The method as claimed in claim 1, wherein the FAT journaling cache of the storage device comprises a plurality of cache blocks, each said cache block including an FAT cache, a directory entry cache and a data cache to thereby allow the FAT journaling cache to execute a multiple-file-operation journaling.

7. The method as claimed in claim 1, wherein the FAT journaling cache uses a descriptive language to characterize a corresponding change produced by each FAT file operation to thereby allow the FAT journaling cache to execute a journaling file operation.

8. The method as claimed in claim 1, wherein the driver is a block driver.

9. A journaling FAT file system, comprising:
   an FAT file system module, which has a journaling module and receives a file operation instruction sent by a operating system;
   a storage device, which has an FAT file system and an FAT journaling cache~wherein the FAT journaling cache of the storage device includes an FAT cache, a directory entry cache and a data cache to thereby allow the FAT journaling cache to execute a one-file-operation journaling; and
   a driver, which is coupled to the FAT file system module, the journaling module and the storage device in order to access the storage;
   wherein, when the FAT file system stored in the storage device is a journaling FAT file system, the FAT file system module enables the journaling module to produce a corresponding file operation instruction to the driver according to the operating system, and the driver performs a file operation on the storage device; and wherein the FAT journaling cache of the storage device comprises a plurality of cache blocks, each having an FAT cache, a directory entry cache and a data cache to thereby allow the FAT journaling cache to execute a multiple-file-operation journaling.

10. The system as claimed in claim 9, wherein the storage device is an NAND, NOR flash memory storage device, or a disk drive.

11. The system as claimed in claim 9, wherein the FAT file system of the storage device is an FAT12, FAT16 or FAT32 file system.

12. The system as claimed in claim 9, wherein the FAT journaling cache uses a descriptive language to characterize a corresponding change produced by each FAT file operation to thereby allow the FAT journaling cache to execute a journaling file operation.

13. The system as claimed in claim 9, wherein the driver is a block driver.

* * * * *